United States Patent Office 3,481,872
Patented Dec. 2, 1969

3,481,872
DEGRADATION RESISTANT AND NON-CORROSIVE HIGH-TEMPERATURE LUBRICANT FORMULATION
Roland E. Dolle, Jr., Lancaster, Calif., and Frank J. Harsacky and Christ Tamborski, Dayton, Ohio, assignors to the United States of America as represented by the Secretary of the Air Force
No Drawing. Continuation-in-part of application Ser. No. 581,419, Sept. 21, 1966. This application Feb. 13, 1968, Ser. No. 705,026
Int. Cl. C10m 3/38, 3/24
U.S. Cl. 252—49.9    7 Claims

ABSTRACT OF THE DISCLOSURE

A degradation resistant, non-corrosive, high temperature lubricant formulation composed of a hydrogen-containing fluoro carbon base fluid and a minor weight proportion of a perfluoroaryl-phosphorus-containing compound of the class thereof which consists of tris (pentafluorophenyl)phosphine, tris (pentafluorophenyl)phosphine oxide, tris[4-(pentafluorophenoxy)tetrafluorophenyl]phosphine and tris (4-heptafluorotolyl)phosphine.

CROSS REFERENCES TO RELATED APPLICATIONS

The present application is a continuation-in-part of the application, Ser. No. 581,419, filed Sept. 21, 1966 now U.S. Patent 3,393,151 dated July 16, 1968, by the same applicants as those herein and entitled "Perfluorinated Aliphatic Polyether Lubricant with a Perfluorinated Phenyl Compound Additive" which application was itself a continuation-in-part of that application, Ser. No. 475,608 filed July 28, 1965, now abandoned, by the same applicants as those herein and entitled "Perfluorinated Aliphatic Ether Lubricant."

BACKGROUND OF THE INVENTION

Field of the invention

The within invention pertains to the art of lubricants generally and specifically to such as are able to withstand severe oxidative stress at temperatures of 500° Fahrenheit and above without appreciable degradation and without corroding or otherwise deteriorating the metals with which they are in contact.

Description of the prior art

As the art has advanced generally in those areas wherein lubrication is required, and particularly with the advent of high speed turbine engines of the type that are employed for modern aerospace vehicles, missiles, rockets and the like, high speeds and high temperatures are encountered with greater frequency. At the present time the materials of which such engines are made and the formulations employed to lubricate the moving parts thereof represent critical limitations upon man's ability to continue to advance in the general fields of aerospace travel and the like. At the present state of the art, a variety of previously known though not hitherto employed metals and metal alloys are being used with greater frequency; and a variety of new lubricant materials are being developed and considered.

In the case of gas turbine engines for example, temperatures of 500° Fahrenheit and above are regularly encountered, and none of the lubricants that were in general widespread use as long as five years ago are capable of withstanding such temperatures. Particularly is this so in view of the fact that in most cases the lubricant is also subjected to high oxidative stress at such elevated temperatures. Of late however several fluoro carbon liquids demonstrating inertness and thermal stability and a reasonable retention of lubricious characteristics up to the 500° Fahrenheit level have been developed. After only very short periods of operation at temperatures of 500° or above however, these fluoro carbon liquids lose their lubricity, undergo serious volatilization or degradation and/or exert a damaging corrosive influence upon the metallic parts with which they are in contact. The corrosive interaction between the lubricant and the metal parts not only damages the latter but also results in damaging changes in the viscosity, acidity and other characteristics of the lubricant itself so that the lubricating function is actually destroyed from both directions.

SUMMARY OF THE INVENTION

It is accordingly an object of the present invention to provide improved lubricant formulations based upon the more recently developed fluoro carbon base or neat fluids. More specifically, it is an object of the invention to provide such lubricants which will not attack conventional metals and alloys at elevated temperatures and will not themselves be subject to deleterious change in response thereto. Yet a more specific object of the invention is to provide an improved additive for perfluorinated aliphatic polyether liquids or base fluids which will improve their life and performance capabilities at elevated temperatures and under severe conditions of oxidative stress and the like of the type that are normally encountered in high speed gas turbine engines. Yet a more specific object of this invention is the provision of additives to lubricant formulations based upon the most recently developed fluorinated ethers which are hydrogen-containing.

These and other objects and advantages which will appear from the following disclosure are achieved in the case of the present invention by the incorporation with the hydrogen-containing perfluorinated aliphatic polyether neat fluids of minor weight proportions or a perfluoroaryl-phosphorus-containing compound and specifically one or more of that class thereof which consists of tris (pentafluorophenyl)phosphine, tris (pentafluorophenyl)phosphine oxide, tris [4-(pentafluorophenoxy)tetrafluorophenyl]phosphine and tris (4-heptafluorotolyl)phosphine.

As disclosed in the above-mentioned co-pending application Ser. No. 581,419, perfluorinated aliphatic ether lubricant formulations consisting of a completely fluorinated polymer as a fluoro carbon base fluid and a small amount of a perfluoroaryl-type additive admixed therewith have shown promise for gas turbine engines and comparable applications where temperatures of from 500° to 600° Fahrenheit are anticipated. The completely fluorinated polymers have however been relatively expensive to prepare; and, more recently, a related class of fluorocarbon fluids which are not completely fluorinated, but contain hydrogen, are being studied for gas turbine engine and accessory gear lubrication applications. At least one particular series of such hydrogen-containing fluorinated ethers have proved to be considerably less expensive to manufacture than the completely fluorinated ethers. These hydrogen-containing fluoro carbon base fluids have been found however to be unstable oxidatively in the 500° to 600° Fahrenheit range; and the presence of the hydrogen atoms and the different characteristics of their end groups has heretofore suggested that they would not be amenable for use in high performance gas turbine engines or in other applications where high temperatures of on the order of 500° Fahrenheit and above are to be encountered in highly oxidative environments. Particularly this has been so since they have degraded badly in such environments in the presence of titanium alloys and have severely attacked ferrous alloys such as mild steel, stainless steel and tool steel and silver in addition to the titanium alloys. As will be hereinafter demonstrated however, it has been found that the addition of even very minor weight proportions of the above-enumerated additives to these hydrogen-containing fluoro carbon ethers does substantially improve their thermal stability, even under severe oxidative stress at temperatures of from 500° to 600° Fahrenheit and retards their assumption of corrosive characteristics, even after prolonged exposure to such conditions in contact with ferrous and titanium alloys and silver.

DESCRIPTION OF THE PREFERRED EMBODIMENTS

A specific homologous series of hydrogen-containing fluorinated ethers of the type here considered as a base or neat fluid for the lubricant formulations comprises the hexafluoropropyl ethers which are prepared from hexafluoropropylene oxide and have the general structural formula:

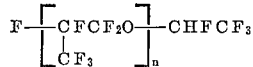

where $n$ is an integer. A series of such hexafluoropropyl ethers is currently available from the "Freon" Products Division of E. I. du Pont de Nemours & Company of Wilmington, Del. 19898 which manufactures and sells the same under the proprietary name of "Freon E" series fluoro carbon liquids wherein the proprietary name includes a numeral following the "E" which represents the $n$ value in the above structural formula. In the presently available series of "Freon E" fluids, "Freon E-1" through "Freon E-6" are individual pure products wherein the number in the name corresponds to the $n$ in the formula whereas the higher homologues such as from "Freon E-7" and above are offered as mixtures of a variety of homologues in each of which the $n$ value may vary from one to 17 with the average $n$ value for the mixture corresponding approximately to the number in the name.

Thus, any particular homologue above the "Freon E-7" can vary in the composition of its mixture so long as the average $n$ corresponds to the number in the name.

For the purposes of the present disclosure, the description of certain specific preferred embodiments of the invention will consider several of the presently available "Freon E-9" fluids according to the following mixtures of homologues wherein the "E" number represents the specific homologue and the percentage following it represents the weight percent such homologue comprises of the total mixture.

*Sample A.*—E4–0.4%; E5–11.3%; E6–2.0%; E7–9.4%; E8–16.5%; E9–18.5%; E10–15.3%; E11–10.9%; E12–7.3%; E13–4.7%; E14–2.4%; E15–0.9%; E16–0.2%; E17–0.6%.

*Sample B.*—E5–0.006%; E6–0.06%; E7–0.23%; E8–5.0%; E9–26.5%; E10–30.0%; E11–24.2%; E12–12.2%; E13–2.1%.

*Sample C.*—E5–2%; E6–8%; E7–14%; E8–17%; E9–19%; E10–15.5%; E11–11.2%; E12–6.7%; E13–¾%; E14–1.6%.

To demonstrate the benefits derived from the addition of minor amounts; i.e., from 0.1% to 5.0% by weight of the total formulation of an inhibitor additive selected from the above class, the following oxidation-corrosion test was employed. Dry air was bubbled at the rate of one liter per hour through 20 milliliters of the lubricant formulation being tested in which were immersed various metal specimens in the shape of washers or annular discs three-fourths of an inch in diameter, 0.032 inch thick and having a center hole one-quarter inch in diameter. The metals employed in the test correspond to those customarily encountered or contemplated for use in a variety of high temperature, high oxidative stress applications such as high performance gas turbine engines; and the nominal composition of the specific metals as named and numbered are those adopted by the American Iron and Steel Institute, the Society of Automotive Engineers or the Aeronautical Material Specifications, all as set forth in Metals Handbook Volume 1, Properties and Selection of Metals, eighth edition, American Society for Metals, Metal Park, Ohio, 1961.

In one series of tests, the tris(pentafluorophenyl) phosphine, in the weight proportions indicated, was added to that particular "Freon E-9" base fluid (Sample A above) and the above-described oxidation-corrosion tests with the metal specimens immersed in the lubricant formulation were run for 72 hours at a constant temperature of 500° Fahrenheit. In this as in all of the other tests hereinafter described, the carefully weighed portion of the additive or inhibitor was admixed with the base fluid by stirring at temperatures of up to 250° Fahrenheit until all of the additives had gone into solution. The effects shown on the following table were noted:

TABLE 1

| Weight Percent of Additive | Percent Fluid Loss | Percent Viscosity Change at 100° F. | Acid No. Increase mg. KOH/g. | Metal Weight Change in Milligrams per Square Centimeter | | | | |
|---|---|---|---|---|---|---|---|---|
| | | | | Silver | Aluminum 2024 Alloy | Titanium AMS-4911 Alloy | 301 Stainless Steel | M-10 Tool Steel |
| None | 26.2 | +13.6 | 3.1 | −4.73 | +0.08 | −1.03 | −3.93 | +0.83 |
| 0.2 | 0.2 | +0.8 | 0.0 | −0.21 | 0.00 | −0.01 | 0.00 | 0.00 |
| 0.5 | 0.5 | +2.5 | <0.1 | −0.35 | +0.03 | +0.02 | +0.02 | +0.06 |
| 5.0 | 0.2 | (¹) | 0.2 | −0.45 | 0.00 | 0.00 | 0.00 | −0.01 |

¹ This value not measured because of the insolubility of 5.0 weight percent of the tris (pentafluorophenyl) phosphine in the "Freon E 9" at 100° Fahrenheit.

Where 0.5 weight percent of tris(pentafluorophenyl)phosphine oxide was used as an additive in lieu of the tris-(pentafluorophenyl)phosphine and added to the Sample A "Freon E-9" base fluid and tested in the same series of tests as those represented in Table 1 above, the fluid loss was 0.5%, the change in the kinematic viscosity at 100° Fahrenheit was +6.8%, the acid number increase in milligrams of potassium hydroxide per gram of the formulation was <0.1% and there was no change in the weight of the metal specimens except that the M-10 tool steel gained 0.04 milligram per square centimeter of the specimen surface.

In another series of tests involving the same tris-(pentafluorophenyl)phosphine additive in the same Sample A "Freon E-9" base fluid at a constant temperature of 600° Fahrenheit for six hours, the following results were obtained:

TABLE 2

| Weight Percent of Additive | Percent Fluid Loss | Percent Viscosity Change at 100° F. | Acid No. Increase, mg. KOH/g. | Metal Weight Change in Milligrams per Square Centimeter | | | |
|---|---|---|---|---|---|---|---|
| | | | | M-1 Tool Steel | 4140 Steel | 440c Stainless Steel | Inconel 600 |
| None | 49.5 | +13.6 | 0.5 | −1.05 | +0.98 | +0.22 | −0.01 |
| 0.5 | 0.0 | +2.5 | <0.1 | +0.02 | +0.03 | 0.00 | 0.00 |
| 1.0 | 0.0 | +3.4 | <0.1 | +0.03 | +0.04 | +0.02 | 0.00 |

Where 0.5 weight percent of the tris(pentafluorophenyl)-phosphine oxide was added to the same fluid and tests conducted as above, the fluid loss was 0.3%, the change in kinematic viscosity at 100° Fahrenheit was +4.2%, the acid number increase in milligrams of potassium hydroxide per gram of the lubricant formulation was <0.1 and the change in the metallic weight in milligrams per square centimeter of the metallic specimen surface was +0.02 for the M-1 tool steel, +0.02 for the 4140 steel, +0.01 for the 440c stainless steel and 0.00 for the Inconel 600.

In another series of tests wherein the tris(pentafluorophenyl)phosphine and the tris(pentafluorophenyl)phosphine oxide were employed with the same Sample A "Freon E-9" base fluid as the lubricant formulation, a specimen of the AMS-4925 titanium alloy (4% aluminum and 4% manganese) was immersed in the fluid, the test was conducted for six hours at a constant temperature of 600° Fahrenheit and the following values were obtained:

49.8 percent, a kinematic viscosity change at 100° Fahrenheit of −30.6%, an acid number increase of 0.6 and a weight change of −0.31 milligram per square centimeter. With 0.5 weight percent of the tris(pentafluorophenyl) phosphine added, the fluid loss was reduced to 0.2%, the viscosity change was only +1.6% at 100° Fahrenheit, the acid number increase was less than 0.1 and there was no weight change in the specimen.

A review of the test results given in the above tables will demonstrate that liquid formulations involving the Sample A "Freon E-9" base fluid to which as little as 0.5 weight percent of the tris(pentafluorophenyl)phosphine oxide was added gave rise under the oxidation corrosion tests to only nominal or no evidence of corrosion and minor fluid degradation. On the other hand, the use of the base fluid without any inhibitor resulted in considerable corrosion of the silver, titanium alloy, stainless steel and tool steel specimens, as well as substantial fluid degradation resulting in much acid formation and significant fluid loss. In the presence of the titanium alloy specimen in

TABLE 3

| Weight Percent of Additive | Percent Fluid Loss | Percent Viscosity Change at 100° F. | Acid No. Increase, mg. KOH/g. | Percent Change in Metal Weight in Milligrams Per Square Centimeter of the Specimen Surface |
|---|---|---|---|---|
| None | 44.5 | −15.2 | 2.2 | −0.35 |
| 0.1% of tris (pentafluorophenyl) phosphine | 0.0 | +0.8 | <0.1 | −0.02 |
| 0.5% of tris (pentafluorophenyl) phosphine | 0.2 | +2.5 | 0.1 | +0.02 |
| 0.1% of tris (pentafluorophenyl) phosphine oxide | 0.2 | +0.8 | 0.1 | −0.03 |
| 0.5% of tris (pentafluorophenyl) phosphine oxide | 0.3 | +3.4 | 0.2 | +0.02 |

The same oxidation-corrosion tests were conducted employing the Sample B "Freon E-9" base fluid for 72 hours at 500° Fahrenheit as indicated in the table below, first with no additive whatsoever and second with 0.5 weight percent of the tris(pentafluorophenyl)phosphine added to the Sample B "Freon E-9" fluid.

Table 3 wherein the test was run for six hours at 600° Fahrenheit, the base fluid with no additive degraded badly resulting in considerable fluid loss, a decrease in viscosity, much acid formation and serious attack of the metal specimen. Where as little as 0.1 weight percent of the tris(pentafluorophenyl)phosphine was added however, no fluid

TABLE 4

| Lubricant Formulation Sample B | Percent Fluid Loss | Percent Viscosity Change at 100° F. | Acid No. Increase, mg. KOH/g. | Metal Weight Change in Milligrams per Square Centimeter | | | | |
|---|---|---|---|---|---|---|---|---|
| | | | | Silver | Aluminum 2024 Alloy | Titanium AMS-4911 Alloy | 301 Stainless Steel | M-10 Tool Steel |
| No additive | 18.9 | −4.7 | 4.1 | −3.72 | +0.05 | −0.56 | −2.97 | +0.39 |
| With 0.5 weight percent of tris (pentafluorophenyl) phosphine | 0.3 | +1.0 | <0.1 | −0.07 | 0.00 | 0.00 | −0.01 | +0.01 |

In another oxidation corrosion test comparison of the same Sample B "Freon E-9" fluid with and without the 0.5 weight percent of the tris(pentafluorophenyl)phosphine conducted for six hours at 600° Fahrenheit, the following results were obtained:

degradation occurred and the titanium alloy was not harmed.

Experimental results have indicated that noticeable improvements may be obtained where the tris(pentafluorophenyl)phosphine or the tris(pentafluorophenyl)phosphine

TABLE 5

| Lubricant Formulation Sample B | Percent Fluid Loss | Percent Viscosity Change at 100° F. | Acid No. Increase, mg. KOH/g. | Metal Weight Change in Milligrams per Square Centimeter | | | |
|---|---|---|---|---|---|---|---|
| | | | | M-1 Tool Steel | 4140 Steel | 440c Stainless Steel | Inconel 600 |
| No additive | 56.7 | +4.1 | 0.6 | −0.32 | +0.87 | +0.46 | +0.04 |
| With 0.5 weight percent of tris (pentafluorophenyl) phosphine | 0.3 | +2.1 | <0.1 | +0.02 | +0.01 | +0.01 | 0.00 |

Where the same oxidation corrosion test was conducted with the same Sample B fluid with and without the 0.5 weight percent tris(pentafluorophenyl)phosphine additive and the metal specimen was titanium AMS-4925 alloy, the formulation containing no additive showed a fluid loss of oxide additives represent as little as 0.1 weight percent of the total lubricant formulation and that additions of up to 5 weight percent of the additive are effective. In the usual case however, the additive will be present in the final formulation in a weight percentage of from 0.1% to 0.5% by weight. In these latter concentrations, the additive is soluble in the "Freon E-9" fluids at elevated temperatures in the range of 180° Fahrenheit and above. They are however soluble in the "Freon E-9" fluids in only minute quantities at room temperature. Although better solubility can perhaps be obtained with analogs of tris(pentafluorophenylphosphine and the oxide incorporating one or more stabilizing groups, solubility at room temperature or below is not considered detrimental if the formulation is to be used as a "base oil" for high temperature grease formulations, in view of the fact that the additives' solubility and activation may be achieved at the higher operating temperatures.

To demonstrate the effectiveness of the tris[4-(pentafluorophenoxy) tetrafluorophenyl]phosphine with the perfluorinated aliphatic polyether base fluids, this additive was admixed with the "Sample C" Freon E-9 fluid identified above and comparable oxidation-corrosion tests were run. In such a test involving the "Sample C" base fluid with and without 0.05 weight percent of the tris[4-(pentafluorophenoxy)tetrafluorophenyl]phosphine for 72 hours at a constant temperature of 500° Fahrenheit, the following results were obtained:

as the same specimen after the test in the formulation containing the additive was shiny and displayed only a light brown discoloration with no gray smears.

As can be seen from the results shown in Tables 6, 7 and 8 above, as little as from 0.05 to 0.10 weight percent of the tris[4 - (pentafluorophenoxy)tetrafluorophenyl] phosphine to the "Freon E-9" base fluid eliminated both fluid degradation and metal corrosion at the 500° and 600° Fahrenheit temperatures. It should be noted for example that the silver, the titanium alloy, the stainless steel and the M-10 tool steel were attacked badly in the oxidation-corrosion tests of 500° Fahrenheit after 72 hours as evidenced by the large weight changes in the metal specimens. When only 0.05% of the tris-[4-(pentafluorophenoxy)tetrafluorophenyl]phosphine was added however, none of these metals was harmed as evidenced by the fact that the weight change was negligible. It will also be observed that the same benefits were obtained in the 600° Fahrenheit test after six hours in which the M-10 tool steel, the 4140 steel and the 440c stainless steel were attacked in the uninhibited base fluid but were not touched in the same tests where the formulation contained 0.1 weight percent of the additive. As shown in Table 8,

TABLE 6

| Lubricant Formulation Sample C | Percent Fluid Loss | Percent Viscosity Change at 100° F. | Acid No. Increase mg. KOH/g. | Metal Weight Change in Milligrams per Square Centimeter | | | | |
|---|---|---|---|---|---|---|---|---|
| | | | | Silver | Aluminum 2024 Alloy | Titanium AMS-4911 Alloy | 301 Stainless Steel | M-10 Tool Steel |
| No additive | 38.2 | +7.9 | 3.7 | −5.09 | +0.04 | −1.71 | −3.59 | +0.38 |
| With 0.05 weight percent of tris-[4-pentafluorophenoxy)-tetrafluoropropyl] phosphine | 0.5 | +1.8 | <0.1 | 0.00 | +0.01 | −0.02 | 0.00 | +0.01 |

In a similar oxidation-corrosion comparison test, the "Sample C" Freon E-9 base fluid was tested with and without the addition of 0.1 weight percent of the tris[4-(pentafluorophenoxy)tetrafluorophenyl]phosphine at a constant temperature of 600° Fahrenheit for six hours. The results were as follows:

where the pure titanium and the two titanium alloys were immersed in the uninhibited base fluid at 600° Fahrenheit for six hours, not only were they attacked but the fluid itself degraded badly as evidenced by considerable fluid loss, acid formation and negative viscosity changes. Under identical conditions however, where the lubricant

TABLE 7

| Lubricant Formulation Sample C | Percent Fluid Loss | Percent Viscosity Change at 100° F. | Acid No. Increase, mg. KOH/g. | Metal Weight Change in Milligrams per Square Centimeter | | | |
|---|---|---|---|---|---|---|---|
| | | | | M-1 Tool Steel | 4140 Steel | 440c Stainless Steel | Inconel 600 |
| No additive | 45.1 | +9.6 | 0.6 | −0.34 | +0.80 | +0.41 | +0.03 |
| With 0.1 weight percent of tris-[4-(pentafluorophenoxy)tetrafluorophenyl]-phosphine | 0.3 | +1.8 | 0 | +0.01 | +0.01 | 0.00 | 0.00 |

In yet another oxidation-corrosion test of the same "Sample C" base fluid with and without the 0.1 weight percent of the tris[4 - (pentafluorophenoxy)tetrafluorophenyl]phosphine for six hours at a constant temperature of 600° Fahrenheit the following effects were observed in connection with metal specimens of titanium, a titanium AMS-4911 alloy (6% aluminum and 4% vanadium) and the AMS-4925 titanium alloy (4% aluminum and 4% manganese) disclosed the following:

formulation comprised 0.1 weight percent of the additive, there was no fluid degradation and the metals were not attacked. Again in the case of this particular additive, it will usually be present in the final formulation in a weight percentage of from 0.05 to 0.10. At these concentrations the additive is soluble at from 50° to 100° above room temperature. Although only minute quantities of this additive may be dissolved in the base fluid at room tem-

TABLE 8

| Lubricant Formulation Sample C | Percent Fluid Loss | Percent Viscosity Change at 100° F. | Acid No. Increase, mg. KOH/g. | Metal Weight Change in Milligrams per Square Centimeter | | |
|---|---|---|---|---|---|---|
| | | | | Titanium (pure) | Titanium AMS-4911 Alloy | Titanium AMS-4925 Alloy |
| No additive | 41.5 | −20.2 | 3.9 | −0.33 | +0.01 | −0.33 |
| With 0.1 weight percent of tris [4-(pentafluorophenoxy)tetrafluorophenyl]-phosphine | 0.3 | +1.8 | 0 | 0.00 | 0.00 | 0.00 |

The AMS-4911 titanium alloy had a dull, dark gray surface after the test in the base fluid with no additive whereas perature and below, the formulation is still capable of successful operation at elevated temperatures since the additive will go into solution at such temperatures to provide the desired improvements.

To demonstrate the effects of the tris(4-heptafluorotolyl)phosphine, similar oxidation-corrosion tests were run, first by way of comparison of the "Sample C" Freon E-9 base fluid with and without 0.5 weight percent of the tris(4-heptafluorotolyl)phosphine for 72 hours at a constant temperature of 500° Fahrenheit. The test results were as follows:

In view of the improvements noted above which are achievable by the addition of the disclosed inhibitors to the perfluorinated aliphatic polyether base fluids, it is obvious that lubricant formulations according to this invention may be used in current bearings and other lubricated components without any necessity for changing the metallurgy. At the same time, greater latitude in the selection of metals to be used in the design and fabrication of aerospace vehicles for example that would operate at

TABLE 9

| Lubricant Formulation Sample C | Percent Fluid Loss | Percent Viscosity Change at 100° F. | Acid No. Increase, mg. KOH/g. | Metal Weight Change in Milligrams per Square Centimeter ||||| 
|---|---|---|---|---|---|---|---|---|
| | | | | Silver | Aluminum 2024 Alloy | Titanium AMS-4911 Alloy | 301 Stainless Steel | M-10 Tool Steel |
| No additive | 38.2 | +7.9 | 3.7 | −5.09 | +0.04 | −1.71 | −3.59 | +0.38 |
| With 0.5 weight percent of the tris(4-heptafluorotolyl) phosphine | 0.3 | +3.5 | <0.1 | −0.07 | +0.02 | +0.01 | +0.02 | 0.00 |

Comparative oxidation-corrosion tests of the same base fluid and the same weight proportion of the same additive in connection with test specimens of titanium, the titanium AMS-4911 alloy and the titanium AMS-4925 alloy for six hours at a constant temperature of 600° Fahrenheit produced the following readings:

temperatures of up to 600° Fahrenheit is afforded. Moreover, the improvements of the lubricant according to the present invention provide a higher degree of safety and reliability in that the selection of the metal or a marginal alloy capability is no longer a necessarily critical factor to the operational life of the bearings or other moving

TABLE 10

| Lubricant Formulation Sample C | Percent Fluid Loss | Percent Viscosity Change at 100° F. | Acid No. Increase, mg. KOH/g. | Metal Weight Change in Milligrams per Square Centimeter |||
|---|---|---|---|---|---|---|
| | | | | Titanium (pure) | Titanium AMS-4911 Alloy | Titanium AMS-4925 Alloy |
| No additive | 41.5 | −20.2 | 3.9 | −0.33 | +0.01 | −0.33 |
| With 0.5 weight percent of the tris(4-heptafluorotolyl)phosphine | 0.3 | +1.8 | <0.1 | +0.02 | +0.03 | +0.02 |

Again it was noted that the AMS-4911 titanium alloy exhibited dull, dark gray surface after the test in the uninhibited fluid but was shiny, with no gray smears and only a light gold-brown discoloration after the full test exposure to the formulation containing the 0.5 weight percent of the tris(4-heptafluorotolyl)phosphine.

From Tables 9 and 10 it can be seen that the addition of 0.5 weight percent of the tris(4-heptafluorotolyl)phosphine essentially eliminated degradation of the fluid and metal corrosion. For example, in Table 9, it will be seen that the uninhibited base fluid severely attacked the silver, the aluminum-vanadium-titanium alloy AMS-4911, the 301 stainless steel and the M-10 tool steel as shown by the large weight changes for the metal specimens. When the additive was incorporated in the formulation however none of these metals were harmed as evidenced by the fact that there were substantially no changes in their weights. Where the base fluid was uninhibited, much fluid loss and acid formation resulted but where the additive was present there was negligible fluid loss and hardly any acid formation. These same improved results were obtained in connection with the titanium and titanium alloys as set forth in Table 10.

In certain applications, it might be beneficial to use the tris(4-heptafluorotolyl)phosphine in lieu of the other perfluoroaryl phosphine additive compounds discussed herein because the former is more soluble in the "Freon"-type fluids. Again however, where the formulation is to be employed in applications encountering high operational temperatures, the lack of solubility at room temperature is not a problem since the additive will go into solution before the critical temperature ranges are achieved. Another advantage possibly to be achieved by the use of the tris(4-heptafluorotolyl)phosphine appears to be the fact that its volatility is lower and it does not tend to leave the formulation as readily as do certain of the other perfluoroaryl phosphine additives here discussed.

parts lubricated by formulations according to this invention. In addition to their use as lubricants, the liquid formulations according to the present invention might also find use in fire-resistant hydraulic fluids, and greases as well as lubricants for gas turbine engines, all operating over temperature ranges of from −40° Fahrenheit to as high as 650° Fahrenheit.

While the within invention has been described in connection with certain specific embodiments and examples thereof, it is to be understood that the foregoing particularization has been for the purpose of illustration only and does not limit the scope of the invention as it is more precisely defined in the subjoined claims.

The invention described herein may be manufactured and used by or for the United States Government for governmental purposes without payment to us of any royalty thereon.

What is claimed is:

1. A high-temperature, degradation-resistant, corrosion-inhibited lubricant formulation comprising a major amount of a hydrogen-containing fluorinated aliphatic polyether base fluid and a degradation-retarding and corrosion-inhibiting amount of an additive selected from the group which consists of tris(pentafluorophenyl)phosphine, tris(pentafluorophenyl)phosphine oxide, tris[4-(pentafluorophenoxy)tetrafluorophenyl phosphine and tris(4-heptafluorotolyl)phosphine.

2. A lubricant formulation according to claim 1 wherein the additive comprises from 0.1 to 5.0 weight percent of the total lubricant formulation.

3. A lubricant formulation according to claim 2 wherein the additive is present in the formulation in a weight ratio of from 0.1 to 0.5 part by weight of the additive to 100 parts by weight of the total lubricant formulation.

4. A lubricant formulation according to claim 1 wherein the hydrogen-containing fluorinated aliphatic polyether base fluid is one prepared from hexafluoropropylene oxide and has the general structural formula:

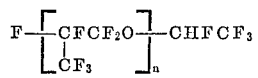

where $n$ is an integer.

5. A lubricant formulation according to claim 1 wherein said hydrogen-containing fluorinated aliphatic polyether base fluid comprises a mixture of several homologues all having the general structural formula:

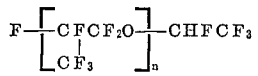

where $n$ is a different integer for each of the homologues present in the mixture.

6. A lubricant formulation according to claim 5 wherein the average of the $n$ values of all of the homologues in the mixture is nine.

7. A lubricant formulation comprising a major amount of a hydrogen-containing fluorinated aliphatic polyether base fluid according to the structural formula:

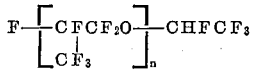

and a degradation-retarding and corrosion inhibiting amount of an additive selected from the class which consists of tris(pentafluorophenyl)phosphine, tris[4-(pentafluorophenoxy)tetrafluorophenyl]phosphine, tris (4-heptafluorotolyl)phosphine and the oxides of said phosphines.

References Cited

UNITED STATES PATENTS

| 3,115,466 | 12/1963 | Orloff et al. | 252—49.9 |
| 3,342,875 | 9/1967 | Selman et al. | 252—54 X |
| 3,367,870 | 2/1968 | Spivack | 252—49.8 |
| 3,393,151 | 7/1968 | Dolle et al. | 252—49.9 |

DANIEL E. WYMAN, Primary Examiner

W. CANNON, Assistant Examiner

U.S. Cl. X.R.

252—54; 400